(12) United States Patent
Kim et al.

(10) Patent No.: US 7,026,399 B2
(45) Date of Patent: Apr. 11, 2006

(54) GOLF BALL INCORPORATING A POLYMER NETWORK COMPRISING SILICONE

(75) Inventors: Hyun Jin Kim, Carlsbad, CA (US); Hong Guk Jeon, Carlsbad, CA (US)

(73) Assignee: Taylor Made Golf Company, Inc., Carlsbad, CA (US)

(*) Notice: Subject to any disclaimer, the term of this patent is extended or adjusted under 35 U.S.C. 154(b) by 71 days.

(21) Appl. No.: 10/662,660

(22) Filed: Sep. 15, 2003

(65) Prior Publication Data

US 2004/0063803 A1    Apr. 1, 2004

Related U.S. Application Data

(60) Provisional application No. 60/414,171, filed on Sep. 27, 2002.

(51) Int. Cl.
*A63B 37/12* (2006.01)
*A63B 37/00* (2006.01)

(52) U.S. Cl. .......... 525/100; 525/105; 525/106; 525/431; 525/453; 525/475; 473/371; 473/378; 473/385

(58) Field of Classification Search ........ 525/105, 525/106; 473/371, 378
See application file for complete search history.

(56) References Cited

U.S. PATENT DOCUMENTS

| | | | |
|---|---|---|---|
| 3,527,842 A | 9/1970 | Clark | 260/825 |
| 4,250,074 A | 2/1981 | Foscante et al. | 260/32.8 |
| 4,454,253 A | 6/1984 | Murphy et al. | 521/112 |
| 4,500,688 A | 2/1985 | Arkles | 525/431 |
| 4,618,644 A | 10/1986 | Liu | 524/535 |
| 4,695,602 A | 9/1987 | Crosby et al. | 524/439 |
| 4,714,739 A | 12/1987 | Arkles | 525/92 |
| 4,764,560 A | 8/1988 | Mitchell | 524/506 |
| 4,766,183 A | 8/1988 | Rizk et al. | 525/454 |
| 4,831,071 A | 5/1989 | Ward et al. | 524/401 |
| 4,842,938 A | 6/1989 | Rizk et al. | 428/416 |
| 4,849,469 A | 7/1989 | Crosby et al. | 524/439 |
| 4,891,407 A | 1/1990 | Mitchell | 525/104 |
| 4,945,125 A | 7/1990 | Dillon et al. | 527/427 |
| 4,955,966 A | 9/1990 | Yuki et al. | 273/218 |
| 4,970,263 A | 11/1990 | Arkles et al. | 525/92 |
| 4,984,803 A | 1/1991 | Llort et al. | 273/235 R |
| 5,120,791 A | 6/1992 | Sullivan | 525/196 |
| 5,253,871 A | 10/1993 | Viollaz | 273/228 |
| 5,255,922 A | 10/1993 | Proudfit | 273/235 R |
| 5,298,571 A | 3/1994 | Statz et al. | 525/330.2 |
| 5,328,959 A | 7/1994 | Sullivan | 525/196 |
| 5,542,677 A | 8/1996 | Sullivan et al. | 473/385 |
| 5,623,030 A | 4/1997 | Tsumura et al. | 525/478 |
| 5,648,426 A | 7/1997 | Zolotnitsky | 525/100 |
| 5,656,279 A | 8/1997 | Dillon | 424/402 |
| 5,669,831 A | 9/1997 | Lutz | 473/377 |
| 5,733,977 A | 3/1998 | Takemura et al. | 525/105 |
| 5,736,619 A | 4/1998 | Kane et al. | 525/393 |
| 5,747,604 A | 5/1998 | Allcock et al. | 525/417 |
| 5,834,546 A | 11/1998 | Harris et al. | 524/320 |
| 5,859,144 A * | 1/1999 | Saito et al. | 525/326.2 |
| 5,919,862 A | 7/1999 | Rajagopalan | 525/63 |
| 5,980,923 A | 11/1999 | Dillon | 424/402 |
| 6,013,715 A | 1/2000 | Gornowicz et al. | 524/492 |
| 6,042,489 A | 3/2000 | Renard et al. | 473/374 |
| 6,067,438 A | 5/2000 | Chen et al. | 399/325 |
| 6,084,031 A | 7/2000 | Medsker et al. | 525/192 |
| 6,103,375 A * | 8/2000 | Birnholz et al. | 428/391 |
| 6,124,389 A | 9/2000 | Cavallaro et al. | 524/432 |
| 6,132,324 A | 10/2000 | Hebert et al. | 473/378 |
| 6,147,160 A | 11/2000 | Wang et al. | 525/106 |
| 6,150,464 A | 11/2000 | Medsker et al. | 525/101 |
| 6,159,110 A | 12/2000 | Sullivan et al. | 473/374 |
| 6,162,134 A | 12/2000 | Sullivan et al. | 473/373 |
| 6,204,331 B1 | 3/2001 | Sullivan et al. | 525/221 |
| 6,213,895 B1 | 4/2001 | Sullivan et al. | 473/374 |
| 6,239,222 B1 | 5/2001 | Nesbitt | 525/193 |
| 6,251,991 B1 | 6/2001 | Takesue et al. | 525/66 |
| 6,274,669 B1 | 8/2001 | Rajagopalan | 525/64 |
| 6,281,286 B1 | 8/2001 | Chorvath et al. | 524/862 |
| 6,328,921 B1 | 12/2001 | Marshall et al. | 264/279.1 |
| 6,353,058 B1 | 3/2002 | Rajagopalan | 525/179 |
| 6,355,715 B1 | 3/2002 | Ladd et al. | 524/432 |

(Continued)

OTHER PUBLICATIONS

Matthews, Polymer Mixing Technology, Applied Science Publishers, Feb. 1984; pp. 5-7.*

*Primary Examiner*—David J. Buttner

(74) *Attorney, Agent, or Firm*—Sheppard, Mullin, Richter & Hampton LLP

(57) ABSTRACT

A composition including a non-silicone material, a silicone material, and a crosslinking agent. The composition forms a structure selected from the group consisting of an interpenetrating network structure and a thermoplastic vulcanizate structure.

9 Claims, No Drawings

U.S. PATENT DOCUMENTS

| | | | |
|---|---|---|---|
| 6,368,236 B1 | 4/2002 | Sullivan et al. | 473/377 |
| 6,369,125 B1 | 4/2002 | Nesbitt | 522/142 |
| 6,371,869 B1 | 4/2002 | Kato et al. | 473/365 |
| 6,426,387 B1 | 7/2002 | Kim | 525/236 |
| 6,433,049 B1 | 8/2002 | Romenesko et al. | 524/261 |
| 6,441,095 B1 | 8/2002 | Keller et al. | 525/221 |
| 2001/0002738 A1 | 6/2001 | Sullivan et al. | 264/279.1 |
| 2001/0011046 A1 | 8/2001 | Ichikawa et al. | 473/371 |
| 2001/0041631 A1 | 11/2001 | Kato et al. | 473/363 |
| 2002/0016226 A1 | 2/2002 | Jin et al. | 473/378 |
| 2002/0022537 A1 | 2/2002 | Nesbitt et al. | 473/378 |
| 2002/0055399 A1 | 5/2002 | Kato | 473/371 |
| 2002/0055567 A1 | 5/2002 | Romenesko et al. | 524/261 |
| 2002/0187857 A1* | 12/2002 | Kuntimaddi et al. | 473/373 |

* cited by examiner

GOLF BALL INCORPORATING A POLYMER NETWORK COMPRISING SILICONE

CROSS-REFERENCE TO RELATED APPLICATION

Priority is claimed to U.S. Provisional Patent Application No. 60/414,171, filed on Sep. 27, 2002, entitled "Interpenetrating Polymer Networks Comprising Silicone And Methods For Making Them" by Kim et al., which application is incorporated by reference herein.

BACKGROUND OF THE INVENTION

This invention relates generally to particular polymer compositions and, more particularly, to polymer compositions incorporating interpenetrating polymer networks that provide for improved properties when used in a variety of products.

Interpenetrating polymer networks (IPNs) are described in a number of sources, including L. H. Sperling, *Interpenetrating Polymer Networks and Related Materials*, Plenum Press, New York & London (1981). IPNs are defined as "a combination of two or more polymers in network form." They can also be described as crosslinked polymer networks held together by permanent entanglements. The networks are held by "topological bonds," essentially without covalent bonding between them.

The most important types of IPNs are semi- and full-IPNs. A full (or true) interpenetrating polymer network is a material containing two polymers, each in network form, with the two polymers having been polymerized or vulcanized independently in the presence of each other to form two networks, which are inter-tangled (interpenetrated) with each other. Semi- (or pseudo-) IPNs have only one crosslinked phase or network within a continuous unlinked polymer matrix phase. It is possible with certain solvent soluble resins to extract this non-crosslinked phase; this is not possible with a true IPN. As a result, true IPN systems must be cast, because once the components are admixed and polymer formation takes place, the interpenetrating networks cannot be separated. In contrast, the single crosslinked network of the semi-IPNs allows these materials to retain their thermoplastic character, although semi-IPNs with thermosetting properties also are possible. The IPNs may be formed using a number of different methods, including the synthesis (polymerization) and/or crosslinking (vulcanization) of the two polymers, taking place sequentially or simultaneously.

IPN technology is well-known in the prior art. IPNs were used industrially before being understood theoretically. The term IPN was introduced in 1960 in the first scientific study of IPNs (polystyrene networks) in *J. Chem. Soc.* (1960) 263, 1311. Dow Corning patented IPN structures in 1970 in U.S. Pat. No. 3,527,842 to obtain pressure-sensitive adhesives incorporating two polysiloxane networks.

Polysiloxanes have many interesting properties, but they possess low mechanical strength. Within IPN structures, polysiloxanes can be closely and permanently combined with a variety of polymeric materials, which can improve mechanical and physical properties significantly.

Additional patents providing relevant disclosures are discussed briefly below.

U.S. Pat. Nos. 4,500,688 and 4,714,739 disclose silicone systems that are vulcanized within a thermoplastic matrix such as polyamides, polyurethanes, styrenics, polyacetals and polycarbonates, to form semi-interpenetrating polymer networks that are either pure silicone polymers or hybrids of a silicone polymer and a non-silicone (e.g., vinyl) polymer. The vinyl-containing silicone is vulcanized in the thermoplastic during melt-mixing according to a chain extension or crosslinking mechanism that employs a silicon hydride-containing silicone component.

U.S. Pat. No. 4,695,602 discloses composites wherein a silicone semi-IPN vulcanized via a hydrosilation reaction is dispersed in a fiber-reinforced thermoplastic resin having a high flexural modulus.

U.S. Pat. No. 6,013,715 teaches the preparation of thermoplastic silicone elastomers wherein a silicone gum (or filled silicone gum) is dispersed in either a polyolefin or a poly(butylene terephthalate) resins and the gum is subsequently dynamically vulcanized therein via a hydrosilation cure system. The resulting elastomers exhibit an ultimate elongation at break of at least 25% and have significantly improved mechanical properties over the corresponding simple blends of resin and silicone gum in which the gum is not cured (i.e., physical blends).

U.S. Pat. No. 6,281,286 discloses that the impact resistance of polyester and polyamide resins can be greatly augmented by preparing a thermoplastic silicone vulcanizate. Although the resulting thermoplastic materials have improved impact resistance, they do not exhibit sufficiently low modulus to be useful as elastomers.

Polymer blends are particularly common in sporting goods, including athletic shoes, skis and ski equipment, snowboards, skates and skating equipment, bicycle components, football equipment, hockey equipment, soccer equipment, protective body gear, protective eyewear, golf clubs, and golf balls. Golf balls, in particular, extensively utilize polymer blends. Golf balls generally are constructed to include a core, at least one cover layer surrounding the core, and optional intermediate layers between the core and cover. A variety of polymer resins and blends of these resins are used to prepare compositions for making these layers. These resins are selected to optimize various ball properties, including speed, spin rate, and durability as demonstrated by shear-cut resistance.

In particular, ball covers have been prepared from balata, trans-polyisoprene ("synthetic balata"), thermoplastic polyurethane, thermoset polyurethane, and ionomer, or blends of these. Golf balls incorporating balata covers provide for a soft "feel" when hit and high spin rate, which improves ball controllability, but they also exhibit poor shear-cut resistance. Examples of golf ball covers incorporating balata and additional materials are disclosed in U.S. Pat. No. 4,984,803 to Llort et al. ("the Llort patent") and U.S. Pat. No. 5,255,922 to Proudfit ("the Proudfit patent"). The limitations of use of balata in covers with respect to poor shear-cut resistance are described in the Llort and Proudfit patents, as well as in U.S. Pat. No. 6,042,489 to Renard et al. and U.S. Pat. No. 6,368,236 to Sullivan et al.

To address the limitations of balata, other materials have been used in ball covers. For example, ball covers have been made incorporating high acid-content copolymeric ionomers, such as those disclosed in U.S. Pat. No. 5,298,571 to Statz et al. These covers provide for balls having superior durability and speed when hit, but they also provide poor "feel" and low spin rate. Covers also have been made from blends of copolymeric and terpolymeric ionomers, such as those disclosed in U.S. Pat. Nos. 5,120,791 and 5,328,959, both to Sullivan. These covers demonstrate improved feel and spin rate compared to those made only from copolymeric ionomers, and they exhibit reduced, but acceptable, shear-cut resistance and ball speed. However, use of these ionomers does not provide for complete flexibility. Ionomers exhibit ionic clustering, in which the metal cation-reacted functional groups cluster together due to the ionic attraction of the functional groups and the metal cations. This clustering is important in determining the physical properties and processability of the ionomers. However, ionomers as prepared have fixed levels of acid content and degree of reaction of the metal cation. As a result, the amount of ionic clustering in the particular ionomer, and the effect on properties of the ionomer, cannot readily be controlled.

In addition to use of balata and ionomers, covers also have incorporated thermoset polyurethane, such as is those disclosed in U.S. Pat. No. 6,132,324 to Hebert et al ("the Hebert patent"). Thermoset polyurethane covers provide good durability, feel, and spin rate, but these covers require complicated processing steps to mold the cover layer and to bring a full cure of the layer, as are described in the Hebert patent and in U.S. Pat. No. 6,328,921 to Marshall et al. Use of thermoplastic, rather than thermoset polyurethane, is described in, for example, U.S. Pat. No. 6,251,991 to Takasue et al. U.S. Pat. No. 6,369,125 to Nesbitt. Covers incorporating thermoplastic polyurethane provide for good feel, spin rate, and greater processability than thermoset polyurethane, but at the cost of poor shear-cut resistance. Also, the processing window (i.e., the range of suitable conditions for processing of the material) for thermoplastic polyurethane generally is narrower than for other thermoplastics used in making golf ball layers, leading to difficulties in manufacture.

Yet another approach for making golf ball cover compositions is to blend copolymeric or terpolymeric ionomers with elastomers. Such cover blends are disclosed in, for example, U.S. Pat. No. 6,371,869 to Kato et al. These blends provide good feel and high spin rate but, like blends of copolymeric and terpolymeric ionomers, they also provide for low shear-cut resistance and reduced ball speed. Additionally, blends of ionomers and elastomers can exhibit incompatibility between these components, leading to deterioration of ball performance and the need to use compatibilizers. Use of compatibilizers is described in patents discussed above, and also in, for example, U.S. Pat. No. 6,274,669 to Rajagopalan (golf ball covers incorporating ionomer blended with non-ionomer and compatibilizer).

Besides their use in ball covers, polymer blends also are used in golf ball cores, and in intermediate layers in multilayer golf balls. The composition and resulting mechanical properties of the core are important in determining the ball's coefficient of restitution (C.O.R.), i.e., the ratio of the ball's post-impact to pre-impact speed, and its PGA compression, i.e., a measure of the deflection on the surface of the ball when a standard force is applied. A high C.O.R. improves ball speed and distance when hit, and generally, a high C.O.R. is achieved by having a high PGA compression. Golf ball cores generally are made from blends incorporating polybutadiene rubber. A number of patents discuss polymer blends for use in golf ball cores. For example, U.S. Pat. No. 6,239,222 to Nesbitt discloses cores comprising polybutadiene rubber and polypropylene powder resins. Also, U.S. Pat. No. 5,834,546 to Harris et al discloses cores comprising polybutadiene rubbers and oxa acids, and U.S. Pat. No. 6,426,387 to Kim discloses cores comprising cobalt-catalyzed polybutadiene rubber having specified material properties. Many different compositions are used, either of multiple polybutadiene rubbers, or of rubbers with other compounds, to prepare ball cores having optimal properties.

The composition of intermediate layers is important in determining the ball's spin rate and controllability. These intermediate layers often are made using soft or hard ionomeric resins, elastomeric resins, or blends of these, similar to those used in cover layers. Like blends for golf ball covers, polymer blends for cores and intermediate layers are prepared generally by dry-blending and/or melt-mixing of the component polymers, along with any required additives or fillers. Examples of polymer blend compositions for intermediate layers are described in a number of patents, including U.S. Pat. No. 6,355,715 to Ladd, which describes an intermediate layer comprising polyether-type polyurethane and a second thermoplastic component, such as a block copolymer, dynamically vulcanized thermoplastic elastomer, or other listed components. Also, U.S. Pat. No. 5,253,871 to Viollaz describes intermediate layer compositions incorporating amide block copolyether and ionomer, and U.S. Pat. No. 6,124,389 to Cavallaro et aL describes intermediate layer compositions incorporating an ethylene methacrylic/acrylic acid copolymer and other specified thermoplastic components.

As discussed above, additional examples exist of use of blends of polymers in a variety of goods, prepared using a number of known techniques. Despite this wide variety, blending of these polymers has a number of disadvantages. Processing of the polymers can be difficult because of poor processability of selected polymers. Also, incompatibility of different polymers can lead to phase separation of the base polymers in the blend, with resulting deterioration of blend properties. Also, despite the wide array of available polymers, tailoring polymers to be used in blends to have optimum properties can be difficult. Any attempt to create a blend to meet a specific set of criteria is limited by the available materials and available methods for forming these materials. That is, despite the wide variety of polymer blends known, there continues to be a lack of ease and flexibility in preparing tailored polymer blends. In view of the above, it is apparent that a need exists for improved methods for preparing polymer blends that provide for good processability, and tailoring of blend properties. The present invention fulfills this need and other needs, and provides further related advantages.

SUMMARY OF THE INVENTION

The present invention resides in an improved composition and method for preparing polymer blends that provide for good processability, and tailoring of blend properties. More particularly, an embodiment of the composition includes a non-silicone material, a silicone material, and a crosslinking agent. The composition forms a structure selected from the group consisting of an interpenetrating network structure and a thermoplastic vulcanizate structure.

In other, more detailed features of the invention, the interpenetrating network structure is a semi-interpenetrating network or a fully-interpenetrating network. Also, the non-silicone material is dispersed in a phase of the silicone material, the silicone material is dispersed in a phase of the non-silicone material, or the non-silicone material and silicone material are mixed to form single phase. Furthermore, the composition is used in golf balls.

In other, more detailed features of the invention, the non-silicone material can be selected from the group consisting of a monomer, an oligomer, a prepolymer, and a polymer. The composition is formed by blending the silicone material and the non-silicone material, and polymerizing/curing the blended silicone material and the non-silicone material mixture with the crosslinking agent. Also, the composition is formed under conditions suitable for inducing polymerization/crosslinking selected from the group consisting of an application of thermal energy, an application of uv radiation, and an application of electron beam radiation.

In other, more detailed features of the invention, the non-silicone material is selected from the group consisting of urethanes, polyepoxides, polyesters, polyamides, polyimides, phenolics, polysiloxanes, sulfides, acrylics, poly (styrene-butadiene), poly (styrene-acrylonitrile), poly (butadiene-acrylonitrile), polychloroprene, poly (chloroprene-acrylonitrile), poly (acrylonitrile-butadiene-styrene), poly (meth)acrylates, poly (2,6-dimethyl-1,4-phenyleneoxide), polycarbonates, styrene-ethylene-butylene-styrene (SEBS) block copolymers, polyolefins, polyacetals, styrene-butadiene copolymers, polyolefin elastomers, polyamide-polyether elastomer base resins, copolymeric ionomers, terpolymeric ionomers, butadiene polymers, butadiene copolymers, thermoset polymer, syndiotactic polybutadiene, epoxides, imides, dienes, and mixtures thereof.

In other, more detailed features of the invention, the crosslinking agent is selected from the group consisting of a sulfur compound, a precious metal-containing material, a peroxide, a crosslinking initiator, and mixtures thereof. The sulfur compound is a sulfur donor. A precious metal included in the precious metal-containing material is selected from the group consisting of rhodium, ruthenium, palladium, osmium, irridium, and platinum. The peroxide is selected from the group consisting of organic peroxides, aliphatic peroxides, aromatic peroxides, and mixtures thereof. The crosslinking initiator is selected from the group consisting of organic azo compounds and phenolic crosslinking initiators. The composition further includes compounds selected from the group consisting of colorants, stabilizers, optical brighteners, antioxidants, processing aids, mold release agents, organic fillers, inorganic fillers, metallic fillers, organic fibers, inorganic fibers, metallic fibers, continuous fibers, non-continuous fibers, and mixtures thereof.

An exemplary method that embodies the invention is a method of making a composition. The method includes providing a silicone material, providing a non-silicone material, providing a crosslinking agent, mixing the silicone material, the non-silicone material, and the crosslinking agent together to form a mixture, and forming a structure from the mixture, wherein the structure is selected from the group consisting of an interpenetrating network structure and a thermoplastic vulcanizate structure.

In other, more detailed features of the invention, the silicone material, the non-silicone material, and the crosslinking agent are dry-mixed to form the mixture, and the mixture is melt-mixed. Alternatively, the silicone material and the non-silicone material are dry-mixed forming a silicone material and non-silicone material mixture, and the crosslinking agent is added during melt-mixing of the silicone material and non-silicone material mixture. Furthermore, instead of adding the crosslinking agent during melt-mixing of the silicone material and non-silicone material mixture, the crosslinking agent is added to the silicone material and non-silicone material mixture by using methods selected from the group consisting of dipping and spraying.

In other, more detailed features of the invention, the silicone material is melt-mixed with the crosslinking agent forming a mixture of the silicone material and crosslinking agent, and the non-silicone material is melt-mixed with the mixture of the silicone material and the crosslinking agent. Alternatively, the non-silicone material is melt-mixed with the crosslinking agent forming a mixture of the non-silicone material and the crosslinking agent, and the silicone material is melt-mixed with the mixture of the non-silicone material and the crosslinking agent. The method further includes the step of reacting the non-silicone material and the silicone material in the presence of the crossslinking agent, wherein a crosslinking reaction is initiated under conditions selected from the group consisting of an application of heat, an application of uv radiation, and an application of electron beam irradiation to the mixture of the non-silicone material and the silicone material in the presence of the crosslinking agent.

Another exemplary method that embodies the invention is a method of incorporating a composition into a golf ball. The method includes providing the composition, which includes a non-silicone material, a silicone material., and a crosslinking agent, where the composition forms a structure selected from the group consisting of an interpenetrating network structure and a thermoplastic vulcanizate structure. The method also includes injection molding and/or compression molding of the composition to form a spherical layer of the golf ball.

In other, more detailed features of the invention, the golf ball includes a central portion, and the step of molding the composition includes injection molding the composition to form a first half shell and a second half shell, wherein the first half shell and the second half shell are configured to interface with one another; and, if necessary, compression molding the first half shell and the second half shell over the central portion of the golf ball to form the spherical layer. Also, the step of providing the composition further includes initiating polymerization and/or crosslinking in the composition. Polymerization or crosslinking is initiated in the composition by a step selected from the group consisting of mixing the composition, injection molding the composition, and compression molding the first half shell and the second half shell. Polymerization or crosslinking is completed during post-curing. Post-curing is accomplished using thermal energy, uv radiation, or electron beam radiation.

Other features and advantages of the present invention should become apparent from the following description of the preferred embodiment, which illustrates, by way of example, the principles of the invention.

DESCRIPTION OF THE PREFERRED EMBODIMENTS

The present invention resides in compositions incorporating semi-IPN, full-IPN, or thermoplastic vulcanizate (TPV) structures. The structures can comprise a non-silicone material as a matrix and silicone material as a dispersed phase, or alternatively silicone material as a matrix and non-silicone material as a dispersed phase, or simply a single phase in which non-silicone material and silicone material are completely mixed. The present invention also resides in methods for making these compositions.

The silicone materials in the present invention can form network structures by vulcanization of a hydride group-containing silicone, a vinyl (unsaturated) group-containing silicone, or silicone containing both hydride and vinyl (unsaturated) groups. The vulcanization reaction is achieved with sulfur compounds, platinum catalysts, peroxides, or mixtures of these. The functional silicones that can be employed in the present invention have a number-average molecular weight of at least 800. Examples of suitable silicone materials include vinyl- and hydride-containing silicones.

The compositions of the present invention are formed by blending of (a) a silicone material and (b) a non-silicone material selected from a group consisting of a monomer, oligomer, prepolymer, or polymer, which is polymerized or cured (vulcanized) after blending with the silicone material using crosslinking agents, such as platinum catalysts, peroxides, sulfur compounds, or mixtures of these, under suitable conditions, including thermal energy, UV radiation, or electron beam irradiation. The non-silicone material used in the compositions can be conventional resins including, but not limited to, polyamides, urethanes, polyolefins, polyesters, epoxides, imides, dienes, phenolics, sulfides, acrylics, polycarbonates, styrenic copolymers, polyacetals, copolymeric or terpolymeric ionomers, butadiene polymers or copolymers. Polymer blends prepared using the method of the present invention also can incorporate colorants, stabilizers, optical brighteners, antioxidants, processing aids, mold release agents, organic fillers, inorganic fillers, metallic fillers, organic fibers, inorganic fibers, metallic fibers, continuous or non-continuous fiber, or mixtures of these.

A variety of mixing methods and sequences are preferred for use with the method of the present invention. For example, (a) silicone material, (b) non-silicone material selected from a group consisting of a monomer, oligomer, prepolymer, or polymer, and (c) curing agents (i.e., crosslinking agents, such as platinum catalysts, peroxides, sulfur compounds, or mixture of these), can be dry-mixed simultaneously to form a mixture, and then the mixture can be melt-mixed. Alternatively, (a) silicone material and (b) non-silicone material can be dry-mixed, and then (c) curing agent can be added during melt-mixing of the silicone material and non-silicone material. Also, (a) silicone material can be melt-mixed with (c) curing agent, and then (b) non-silicone material can be melt-mixed with a mixture of (a) silicone material and (c) curing agent, with or without additional curing agent. Additionally, (b) non-silicone material can be melt-mixed with (c) curing agent, and then (a) silicone material can be mixed with this mixture of (b) non-silicone material and (c) curing agent, with or without additional curing agent.

Instead of using a melt-mixing method, curing agent can be applied to the mixture of silicone material and non-silicone material by using methods such as dipping or spraying of the curing agent. If a melt-mixing method is used, any combination of melt-mixing steps can be performed using any conventional mixers, such as a roll mill, banbury mixer, extruder, and/or injection molding machine, or combinations of these. When the components are melted together, (a) silicone materials may react with (b) non-silicone material selected from a group consisting of a monomer, oligomer, prepolymer, or polymer to begin formation of a network structure, or (b) non-silicone material selected from a group consisting of a monomer, oligomer, prepolymer, or polymer may react on its own to form a network structure. Polymerization and/or crosslinking (i.e., vulcanization) reactions can begin to take place during melt-mixing, or during any other stage of processing, such as molding. If necessary, any further crosslinking reaction can be completed during a post-cure step; for example, by applying thermal energy, uv radiation, or electron-beam radiation. Various types of structures, such as full-IPNs, semi-IPNs, or TPVs can be obtained, depending on the miscibility of the silicone with the other blending component(s), ratio of those mixed components, chemical structure and molecular weight of the blended components, type and chemistry of crosslinking reaction or vulcanization reaction involved, and the degree of crosslinking or vulcanization in the composition.

The compositions of the present invention can be used to produce consumer or specialty goods in a wide variety of areas in which polymer blends are used, such as aerospace, electronics, apparel, packaging, automobiles, and sporting goods, such as those previously discussed. In particular, the method can be used to prepare sports equipment, such as golf equipment. For example, the method can be used to prepare a composition for making any part of a golf ball, such as core compositions, intermediate layer compositions or cover layer compositions for use in a variety of ball constructions, such as two piece structured golf balls, multi-layered golf balls with solid core, multi-layered golf balls with liquid core, multi-layered golf balls with wound layers. Golf ball compositions produced can be used in golf ball cores, intermediate layers, or covers, and they can be tailored to vary or to optimize a number of golf ball performance properties, such as hardness, coefficient of restitution, hit-feel, spin rate, and scuff resistance, while retaining ease of manufacturing.

Additional details on the component materials of the compositions of the present invention are discussed below.

I. Materials

A. Silicone Material

A silicone material used in a composition of the present invention can be monomer, oligomer, prepolymer, or polymer with or without additional reinforcing filler. One type of silicone material in this invention can have at least 1 alkenyl group having at least 2 carbon atoms in their molecules. Examples of these alkenyl groups include, but are not limited to, vinyl, allyl, butenyl, pentenyl, hexenyl and decenyl. The alkenyl functionality can be located at any location of the silicone structure, including one or both terminals of the structure.

The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups such as methyl, ethyl, propyl, butyl, pentyl and hexyl; cycloalkyl groups such as cyclohexyl and cycloheptyl; aryl groups such as phenyl, tolyl and xylyl; aralkyl groups such as benzyl and phenethyl; and halogenated alkyl groups such as 3,3,3-trifluoropropyl and chloromethyl.

Another type of silicone material suitable for use in the present invention is one having hydrocarbon groups that lack aliphatic unsaturation.

Specific examples of suitable silicone materials for use in making compositions of the present invention include: trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and similar copolymers wherein at least one end group is dimethylhydroxysiloxy.

Reinforcing filler, which may be incorporated into this component, is a finely divided filler known to reinforce silicones. This filler preferably is selected from finely divided, heat-stable minerals, such as fumed and precipitated forms of silica, silica aerogels and titanium dioxide having a specific surface area of at least about 10 m²/gram. Preferably, the fumed silica filler is treated to render its surface hydrophobic.

Commercially available silicone materials and sources of silicone materials suitable for use in the present invention include the following: Silastic by Dow Corning Corp. of Midland, Mich., Blensil by GE Silicones of Waterford, N.Y.; and, Elastosil by Wacker Silicones of Adrian, Mich.

B. Non-silicone Material

Suitable non-silicone material for forming full-IPNs, semi-IPNs, or TPVs with silicone to form compositions within the scope of the present invention include: urethanes, polyepoxides, esters, polyamides, polyimides, phenolics, sulfides, acrylics, poly (styrenebutadiene), poly (styrene-acrylonitrile), poly (butadiene-acrylonitrile), polychloroprene, poly (chloroprene-acrylonitrile), poly (acrylonitrile-butadiene-styrene), poly (meth)acrylates, poly (2,6-dimethyl-1,4-phenyleneoxide), polyamides (e.g., nylon), polycarbonates, styrene-ethylene-butylene-styrene (SEBS) block copolymers, polyolefins, polyacetals, styrene-ethylene-propylene-styrene (SEPS), styrene-butadiene and styrene-isoprene block copolymers that may be partially or fully hydrogenated, polyolefin elastomers, epoxides, imides, dienes, and polyamide-polyether elastomer base resins.

1. Particular Non-ionomeric Non-silicone Materials

Suitable non-ionomeric non-silicone materials include: thermoplastic elastomer, thermoplastic elastomer modified with various functional or polar groups, thermoplastic rubber, thermoplastic polyester, polyamide, polyamide copolymer, liquid crystalline polymer, thermoset elastomer, dynamically-vulcanized thermoplastic elastomers, metallocene polymers or blends of these. Additional suitable non-ionomeric non-silicone materials include: polyethyleneterephthalate, polybutyleneterephthalate, polyphenylenesulfide, polypropyleneoxide, polypropylene, polyethylene, polycarbonate, polyetherester elastomers, polyesterester elastomers, polyetheramide elastomers, propylene-butadiene copolymers, modified copolymers of ethylene and propylene, styrenic copolymers including styrenic block copolymers and randomly distributed styrenic copolymers such as styrene-isobutylene copolymers, ethylene-vinyl acetate copolymers (EVA), 1,2-polybutadiene, and dynamically vulcanized PP/EPDM, polyether or polyester thermoplastic urethanes as well as thermoset polyurethanes, an elastomer, a block copolymer having at least one block A comprising an aromatic vinyl compound and at least one polymer block B comprising a conjugated diene compound, and having a hydroxyl group at the terminal of the block copolymer. Examples of suitable non-ionomeric copolymers for use with the present invention are marketed under the name PRIMACOR by Dow Chemical Company of Midland Mich. Other suitable non-silicone materials include polyester elastomers marketed under the name SKYPEL by SK Chemicals of South Korea, triblock copolymers marketed under the name HG-252 by Kuraray Corporation of Kurashiki, Japan, as well as polymers sold under the trademarks LEXAN and VALOX marketed by GE Plastics of Pittsfield, Mass., CRISTAMID and RILSAN marketed by ATOFINA Chemicals of Philadelphia, Pa., GRILAMID marketed by EMS-CHEMIE of Sumter, S.C., TENITE marketed by Eastman Chemical Company of Kingsport, Tenn., EXXPOL marketed by ExxonMobil Corporation and ESTANE marketed by BFGoodrich of Cleveland, Ohio, SANTOPRENE, DYTRON, VISAFLEX, and VYRAM marketed by Advanced Elastomeric Systems of Akron, Ohio, and SARLINK marketed by DSM of Haarlen, the Netherlands. Additional suitable non-silicone materials include styrenic copolymers manufactured by Shell chemicals under the trade names KRATON D (for styrene-butadiene-styrene and styrene-isoprene-styrene types) and KRATON G (for styrene-ethylene-butylene-styrene and styrene-ethylene-propylene-styrene types). Examples of suitable randomly distributed styrenic polymers include paramethylstyrene-isobutylene (isobutene) copolymers developed by Exxon Mobil Corporation. Additional suitable non-silicone materials include syndiotactic 1,2 polybutadienes, such as those sold under the trade names RB810, RB820, and RB830 by JSR Corporation of Tokyo, Japan.

C. Crosslinking Agent

The crosslinking agent used in the preparation of the compositions of the present invention can be either an organic peroxide or a precious metal-containing material. Precious metal-containing catalysts can be based on the metals rhodium, ruthenium, palladium, osmium, irridium or platinum. It is particularly preferred that a platinum metal complex be employed as the catalyst, such as that disclosed U.S. Pat. Nos. 3,159,601 and 3,159,662 to Ashby, U.S. Pat. No. 3,220,970 to Lamoreaux, U.S. Pat. No. 3,814,730 to Karstedt, and U.S. Pat. No. 3,516,946 to Modic. Preferred crosslinking initiators are radical initiators, such as organic peroxides and organic azo compounds or phenolic crosslinking initiators. Examples of suitable crosslinking agents include aliphatic peroxides, aromatic peroxides, or mixtures of these. Primary, secondary, or tertiary peroxides can be used, with tertiary peroxides most preferred. Also, peroxides containing more than one peroxy group can be used, such as 2,5-bis-(tert-butylperoxy)-2,5-dimethyl hexane and 1,4-bis-(tert-butylperoxyisopropyl)-benzene. Also, peroxides that are either symmetrical or asymmetric can be used, such as tert-butylperbenzoate and tert-butylcumylperoxide. Additionally, peroxides having carboxy groups also can be used. Decomposition of peroxides used in compositions within the scope of the present invention can be brought by applying thermal energy, radiation energy, shear, reactions with other chemical ingredients, or a combination of these. Homolytically decomposed peroxide, heterolytically decomposed peroxide, or a mixture of those can be used to promote crosslinking reactions with compositions within the scope of this invention. Examples of suitable peroxide compounds for use in compositions within the scope of the present invention include peroxy ketals such as 1,1-bis(t-butylperoxy)-3,3,5-trimethylcyclohexane, 1,1-bis(t-hexylperoxy)-3, 3,5-trimethylcyclohexane, 1,1-bis(t-hexylperoxy)cyclohexane, 1,1-bis(t-butylperoxy)-cyclododecane, 1,1-bis(t-butylperoxy)cyclohexane, 1,4-bis-(t-butylperoxyisopropyl)-benzene, 2,2-bis(t-butylperoxy)octane, n-butyl-4,4-bis(t-butylperoxy)butane and n-butyl-4,4-bis(t-butylperoxy) valerate; dialkyl peroxides such as di-t-butyl peroxide, dicumyl peroxide, t-butylcumyl peroxide, α,α'-bis(t-butylperoxy-m-isopropyl)benzene, α,α'-bis(t-butylperoxy)-diisopropylbenzene, 2,5-dimethyl-2,5-bis(t-butylperoxy)hexane and 2,5-dimethyl-2,5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-toluoyl peroxide; peroxy esters such as t-butylperoxy acetate, t-butylperoxy isobutyrate, t-butylperoxy-2-ethyl hexanoate, t-butylperoxy laurylate, t-butylperoxy benzoate, di-t-butylperoxy isophthalate, 2,5-dimethyl-2,5-di(benzoylperoxy)hexane, t-butylperoxymaleic acid, t-butylperoxyisopropyl carbonate and cumylperoxy octenoate; and hydroperoxides such as t-butyl hydroperoxide, cumene hydroperoxide, diisopropylbenzene hydroperoxide, 2,5-dimethylhexane-2,5-dihydroperoxide and 1,1,3,3-tetramethylbutyl hydroperoxide, or mixtures of these.

Examples of suitable sulfur compounds include sulfur donors. Non-limiting examples of suitable sulfur compounds include dithiodimorpholine (DTDM), caprolactamdisulfide, N,N'-dithio bis-(hexahydro-2H-azepinone), 2-morpholino-dithio-benzothiazole, dipentamethylene thiuramtetrasulfide, N-oxydiethylene dithiocabamyl-N'-oxydiethylene sulfeamide, tetramethyl thiuramdisulfide, 2-mercaptobenzothiazole, zinc-2-mercaptobenzothiazole, dibenzothiazyl disulfide, N-cyclohexyl-2-benzothiazylsulfenamide, N-ter-butyl-2-benzothiazylsulfenamide, 2-benzothiazyl-N-sulfenemorpholide, N,N-dicyclohex-yl-2-benzothiazylsulfenamide, tetramethylthiuram disulfide, tetramethylthiuram monosulfide, tetraethylthiuram disulfide, dimethyldiphenylthiuram disulfide, dipentamethylenethiuram tetrasulfide, zinc dimethyldithicarbmate, zinc diethyldithicarbamate, zinc dibutyldithiocarbamate, zinc pentamethylenedithiocarbamate, zinc ethylpheyldithiocarbamate, zinc ethylphenyldithicarbamate, zinc dibenzyldithiocarbamate, piperadine pentamethylenedithiocarbamate, sodium dimethyldithiocarbamate, sodium dibutyldithiocarbamate, selenium dimethyldithiocarbamate, lead dimethyldithiocarbamate, cadmium dimethyldithiocarbamate, cadmium pentamethylenedithiocarbamate, copper dimethyldithiocarbamate, copper dibutyldithiocarbamate, bismuth dimethyldithiocarbamate, dithiocarbamylsulfenamide, N-oxydiethylenedithiocarbamyl-N'-oxydiethylenesulfenamide, N,N'-ethylenethiourea, N,N-diphenylthiourea, N,N'-diethylthiourea, zinc dibutyldithiophosphate, copper diisopropyldithiophosphate, 2-benzothiazole-N-morpholyldisulfide, and dimorpholine disulfide zinc acrylate, and mixtures of these.

D. Filler and Additives

A colorant material, such as, for example, titanium dioxide, barium sulfate, and/or zinc oxide, and/or other additive material(s) as are well known in the art, may be added to a composition of the present invention. Other additives, such as, for example, metallic fillers, organic fillers, or inorganic fillers may be added as well to for purpose of reinforcement or for a purpose of adjusting specific gravity of a composition in this invention. Any continuous, non-continuous organic, inorganic, or metallic fibers can be added into a composition in this invention. Additional components that can be added to a composition include UV stabilizers, anti-oxidants, optical brighteners, mold-release, and any other processing aids. Such additional ingredients may be added in any amounts that will achieve their desired purpose.

EXAMPLES

Below the preparation of golf balls incorporating compositions within the scope of the present invention is described.

Exemplary Ball Materials:

I. Silicone Base Materials

Silicone base materials can incorporate a vinyl-terminated group, hydride-terminated group, or both of these. Silicone base materials can incorporate a crosslinking agent such as platinum complex, peroxides, sulfur compounds, or mixtures of these. Examples of making silicone base materials are described below.

BASE 1 is a silicone base made from the ratio by weight of vinyl-terminated silicone to hydride-terminated silicone, which ranges between about 1:99 and 99:1, and 0.1–6% fumed silica served both as a reinforcing agent and a process aid. The vinyl-terminated silicone, hydride-terminated silicone, and fumed silica can be dry-mixed, extruded, and palletized, if necessary.

BASE 2 is a silicone base made from 100% hydride-terminated silicone, 0.1–6% fumed silica, and 0.1–10% platinium complex. The hydride-terminated silicone and fumed silica can be dry-mixed and then extruded to incorporate platinum complex into the composition, and palletized, if necessary.

BASE 3 is a silicone base made from 100% vinyl-terminated silicone, 0.1–6% fumed silica, and 0.1–10% organic peroxide. The vinyl-terminated silicone and fumed silica can be dry-mixed, then extruded with organic peroxide and palletized, if necessary.

BASE 4 is a rubber base made from the ratio by weight of vinyl-terminated silicone to hydride-terminated silicone, which ranges between about 1:99 and 99:1, 0.1–6% fumed silica, 0.1–10% platinium complex, and 0.1–10% organic peroxide. There are two different processing methods to make rubber base. The first method involves dry-mixing the vinyl-terminated silicone, hydride-terminated silicone, and fumed silica, and then extruding the mixture, palletizing if necessary, dry blending with platinum complex, and then extruding with organic peroxide. The second method involves dry-mixing hydride-terminated silicone, fumed silica, and organic peroxide, extruding the mixture, palletizing if necessary, dry blended with vinyl-terminated silicone, and then incorporating the platinum complex into the composition.

II. Blends of Silicone with Non-silicone Material

The silicone base materials described above can be blended with non-silicone material selected from a group consisting of a monomer, oligomer, prepolymer, or polymer to form compositions within the scope of the present invention. There are various methods available for making these blends. Some examples include the following: 1) curing agents, such as platinum complex, organic peroxide, sulfur compounds, or a mixture of these, can be introduced to silicone material before mixing with a non-silicone component, 2) curing agents, such as platinum complex, organic peroxide, sulfur compounds, or a mixture of these, can be introduced to a non-silicone component before mixing with silicone component, 3) curing agents, such as platinum complex, organic peroxide, sulfur compounds, or a mixture of these can be introduced to a mixture of a silicone component and a non-silicone component.

Examples of blending methods of the silicone component with 4 different polymers are described in detail below.

II-1. Silicone/Syndiotactic Polybutadiene

Example 1

A golf ball composition comprises a syndiotactic 1,2-polybutadiene having a crystallinity between about 5% and about 50%, a mean molecular weight between about 10,000 and about 350,000, and a percentage of 1,2-bonds of greater than about 70%, and BASE 1, wherein the ratio by weight of syndiotactic 1,2-polybutadiene to the BASE 1 ranges between about 5:95 and about 95:5. More preferably, the ratio by weight of syndiotactic 1,2-polybutadiene to the BASE 1 ranges between about 10:90 and about 90:10, and most preferably between about 20:80 and about 80:20. The golf ball can further comprise UV stabilizers, photostabilizers, photoinitiators, thermal initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of crosslinking agent to syndiotactic 1,2-polybutadiene and BASE 1 preferably ranges between about 0.1:100 and about 10:100, and more preferably between about 0.1:100 and about 5:100. When the composition comprises a crosslinking accelerator, co-crosslinking agent, or mixtures thereof, the ratio by weight of crosslinking accelerator and co-crosslinking agent to syndiotactic 1,2-polybutadiene and BASE 1 preferably ranges between about 0.1:100 and about 20:100, and more preferably between about 0.1:100 and about 10:100.

The method can comprise the steps of preparing a dry-mixture or melt-mixture of BASE 1 and a syndiotactic 1,2, polybutadiene having a crystallinity ranging between about 5% and about 50%, a mean molecular weight ranging between about 10,000 and about 350,000, and a percentage of 1,2-bonds greater than about 70%, and adding a crosslinking agent (such as platinum complex, sulfur compound, organic peroxide, or a mixture of these), a crosslinking accelerator, and a co-crosslinking agent to the mixture.

The method can also comprise the steps of preparing a concentrate comprising a syndiotactic 1,2, polybutadiene having a crystallinity ranging between about 5% and about 50%, a mean molecular weight ranging between about 10,000 and about 350,000, and a percentage of 1,2-bonds greater than about 70%, and a crosslinking agent, a crosslinking accelerator, a co-crosslinking agent, and adding the concentrate to a syndiotactic 1,2, polybutadiene having a crystallinity ranging between about 5% and about 50%, a mean molecular weight ranging between about 10,000 and about 350,000, and a percentage of 1,2-bonds greater than about 70%, and BASE 1. The step of preparing a composition can comprise a step of dry-blending the composition, or a step of mixing the composition using a mill, internal mixer or extruder. The step of mixing the composition can comprise melting the composition.

Example 2

A golf ball composition comprises a syndiotactic 1,2-polybutadiene having a crystallinity ranging between about 5% and about 50%, a mean molecular weight ranging between about 10,000 and about 350,000, and a percentage of 1,2-bonds of greater than about 70%, and BASE 2, wherein the ratio by weight of syndiotactic 1,2-polybutadiene to the BASE 2 ranges between about 5:95 and about 95:5. More preferably, the ratio by weight of syndiotactic 1,2-polybutadiene to the BASE 2 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of crosslinking agent to syndiotactic 1,2-polybutadiene and BASE 2 preferably ranges between about 0.1:100 and about 10:100, and more preferably between about 0.1:100 and about 5:100. When the composition comprises a crosslinking accelerator, co-crosslinking agent, or mixtures thereof, the ratio by weight of crosslinking accelerator and co-crosslinking agent to syndiotactic 1,2-polybutadiene and BASE 2 preferably ranges between about 0.1:100 and about 20:100, and more preferably between about 0.1:100 and about 10:100.

The method can comprise the steps of preparing a dry-mixture or melt-mixture of BASE 2 and a syndiotactic 1,2, polybutadiene having a crystallinity ranging between about 5% and about 50%, a mean molecular weight ranging between about 10,000 and about 350,000, and a percentage of 1,2-bonds greater than about 70%, and adding a crosslinking accelerator, and a co-crosslinking agent to the mixture.

The method can also comprise the steps of preparing a concentrate comprising a syndiotactic 1,2, polybutadiene having a crystallinity ranging between about 5% and about 50%, a mean molecular weight ranging between about 10,000 and about 350,000, and a percentage of 1,2-bonds greater than about 70%, and a crosslinking agent, a crosslinking accelerator, a co-crosslinking agent, and adding the concentrate to a syndiotactic 1,2, polybutadiene having a crystallinity ranging between about 5% and about 50%, a mean molecular weight ranging between about 10,000 and about 350,000, and a percentage of 1,2-bonds greater than about 70%, and BASE 2. The step of preparing a composition can comprise a step of dry-blending the composition, or a step of mixing the composition using a mill, internal mixer or extruder. The step of mixing the composition can comprise melting the composition.

Example 3

A golf ball composition comprising a syndiotactic 1,2-polybutadiene having a crystallinity ranging between about 5% and about 50%, a mean molecular weight ranging between about 10,000 and about 350,000, and a percentage of 1,2-bonds of greater than about 70%, and BASE 3, wherein the ratio by weight of syndiotactic 1,2-polybutadiene to the BASE 3 ranges between about 5:95 and about 95:5. More preferably, the ratio by weight of syndiotactic 1,2-polybutadiene to the BASE 3 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of crosslinking agent to syndiotactic 1,2-polybutadiene and BASE 3 preferably ranges between about 0.1:100 and about 10:100, and more preferably between about 0.1:100 and about 5:100. When the composition comprises crosslinking accelerator, co-crosslinking agent, or mixtures thereof, the ratio by weight of crosslinking accelerator and co-crosslinking agent to syndiotactic 1,2-polybutadiene and BASE 3 preferably ranges between about 01:100 and about 20:100, and more preferably between about 0.1:100 and about 10:100.

The method can comprise the steps of preparing a dry-mixture or melt-mixture of BASE 3 and a syndiotactic 1,2, polybutadiene having a crystallinity ranging between about 5% and about 50%, a mean molecular weight ranging between about 10,000 and about 350,000, and a percentage of 1,2-bonds greater than about 70%, and adding a crosslinking accelerator, and a co-crosslinking agent to the mixture.

Example 4

A golf ball composition comprising a syndiotactic 1,2-polybutadiene having a crystallinity ranging between about 5% and about 50%, a mean molecular weight ranging between about 10,000 and about 350,000, and a percentage of 1,2-bonds of greater than about 70%, and BASE 4, wherein the ratio by weight of syndiotactic 1,2-polybutadiene to the BASE 4 ranges between about 5:95 and about 95:5. More preferably, the ratio by weight of syndiotactic 1,2-polybutadiene to the BASE 4 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of crosslinking agent to syndiotactic 1,2-polybutadiene and BASE 4 preferably ranges between about 0.1:100 and about 10:100, and more preferably between about 0.1:100 and about 5:100. When the composition comprises crosslinking accelerator, co-crosslinking agent, or mixtures thereof, the ratio by weight of crosslinking accelerator and co-crosslinking agent to syndiotactic 1,2-polybutadiene and BASE 4 preferably ranges between about 0.1:100 and about 20:100, and more preferably between about 0.1:100 and about 10:100.

The method can comprise the steps of preparing a dry-mixture or melt-mixture of BASE 4 and a syndiotactic 1,2, polybutadiene having a crystallinity ranges between about 5% and about 50%, a mean molecular weight ranges between about 10,000 and about 350,000, and a percentage of 1,2-bonds greater than about 70%, and adding a crosslinking accelerator, and a co-crosslinking agent to the mixture.

II-2. Silicone/Ionomer

Example 1

A golf ball composition comprising an ionomeric polymer comprising copolymeric or terpolymeric polymer with low or high acid (i.e., greater than 16 weight percent acid) content, which are neutralized to various extents by different metal cations and BASE 1, wherein the ratio by weight of ionomeric polymer to the BASE 1 ranges between about 5:95 and about 95:5. More preferably, the ratio by weight of ionomeric polymer to the BASE 1 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of crosslinking agent to the ionomeric polymer and BASE 1 preferably ranges between about 0.1:100 and about 10:100, and more preferably between about 0.1:100 and about 5:100. When the composition comprises a crosslinking accelerator, co-crosslinking agent, or mixtures thereof, the ratio by weight of crosslinking accelerator and co-crosslinking agent to ionomeric polymer and BASE 1 preferably ranges between about 0.1:100 and about 20:100, and more preferably between about 0.1:100 and about 10:100.

The method can comprises preparing a dry-mixture or melt-mixture of BASE 1 and an ionomeric polymer comprising copolymeric or terpolymeric polymer with low or high acid (i.e., greater than 16 weight percent acid) content, which are neutralized to various extents by different metal cations, and adding a crosslinking agent (such as platinum complex, sulfur compounds, organic peroxides, or mixtures of these), a crosslinking accelerator, and a co-crosslinking agent to the mixture.

The method can also comprise preparing a concentrate comprising an ionomeric polymer comprising copolymeric or terpolymeric polymer with low or high acid (i.e., greater than 16 weight percent acid) content, which are neutralized to various extents by different metal cations, and a crosslinking agent, a crosslinking accelerator, a co-crosslinking agent, and adding the concentrate to an ionomeric polymer comprising copolymeric or terpolymeric polymer with low or high acid (i.e., greater than 16 weight percent acid) content, which are neutralized to various extents by different metal cations, and BASE 1. The step of preparing a composition can comprise a step of dry-blending the composition, or a step of mixing the composition using a mill, internal mixer or extruder. The step of mixing the composition can comprise melting the composition.

Example 2

A golf ball composition comprising an ionomeric polymer comprising copolymeric or terpolymeric polymer with low or high acid (i.e., greater than 16 weight percent acid) content, which are neutralized to various extents by different metal cations, and BASE 2, wherein the ratio by weight of the ionomeric polymer to the BASE 2 ranges between about 5:95 and about 95:5. More preferably, the ratio by weight of the ionomeric polymer to the BASE 2 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of crosslinking agent to the ionomeric polymer and BASE 2 preferably ranges between about 0.1:100 and about 10:100, and more preferably between about 0.1:100 and about 5:100. When the composition comprises a crosslinking accelerator, co-crosslinking agent, or mixtures thereof, the ratio by weight of the crosslinking accelerator and co-crosslinking agent to the ionomeric polymer and BASE 2 preferably ranges between about 0.1:100 and about 20:100, and more preferably between about 0.1:100 and about 10:100.

The method can comprise preparing a dry-mixture or melt-mixture of BASE 2 and an ionomeric polymer comprising a copolymeric or terpolymeric polymer with low or high acid (i.e., greater than 16 weight percent acid) content, which are neutralized to various extents by different metal cations, and adding a crosslinking accelerator, and a co-crosslinking agent to the mixture.

The method also can comprise preparing a concentrate comprising an ionomeric polymer comprising a copolymeric or terpolymeric polymer with low or high acid (i.e., greater than 16 weight percent acid) content, which are neutralized to various extents by different metal cations, and a crosslinking agent, a crosslinking accelerator, a co-crosslinking agent, and adding the concentrate to an ionomeric polymer comprising a copolymeric or terpolymeric polymer with low or high acid (i.e., greater than 16 weight percent acid) content, which are neutralized to various extents by different metal cations, and BASE 2. The step of preparing a composition can comprise a step of dry-blending the composition, or a step of mixing the composition using a mill, internal mixer or extruder. The step of mixing the composition can comprise melting the composition.

Example 3

A golf ball composition comprising an ionomeric polymer comprising a copolymeric or terpolymeric polymer with low or high acid (i.e., greater than 16 weight percent acid) content, which are neutralized to various extents by different metal cations, and BASE 3, wherein the ratio by weight of the ionomeric polymer to the BASE 3 ranges between about 5:95 and about 95:5. More preferably, the ratio by weight of ionomeric polymer to the BASE 3 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of crosslinking agent to ionomeric polymer and BASE 3 preferably ranges between about 0.1:100 and about 10:100, and more preferably between about 0.1:100 and about 5:100. When the composition comprises a crosslinking accelerator, co-crosslinking agent, or mixtures thereof, the ratio by weight of the crosslinking accelerator and co-crosslinking agent to the ionomeric polymer and BASE 3 preferably ranges between about 0.1:100 and about 20:100, and more preferably between about 0.1:100 and about 10:100.

The method can comprise preparing a dry-mixture or melt-mixture of BASE 3 and an ionomeric polymer comprising a copolymeric or terpolymeric polymer with low or high acid (i.e., greater than 16 weight percent acid) content, which are neutralized to various extents by different metal cations, and adding a crosslinking accelerator, and a co-crosslinking agent to the mixture.

Example 4

A golf ball composition comprising an ionomeric polymer comprising a copolymeric or terpolymeric polymer with low or high acid (i.e., greater than 16 weight percent acid) content, which are neutralized to various extents by different metal cations, and BASE 4, wherein the ratio by weight of the ionomeric polymer to the BASE 4 ranges between about 5:95 and about 95:5. More preferably, the ratio by weight of the ionomeric polymer to the BASE 4 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of the crosslinking agent to the ionomeric polymer and BASE 4 preferably ranges between about 0.1:100 and about 10:100, and more preferably between about 0.1:100 and about 5:100. When the composition comprises a crosslinking accelerator, co-crosslinking agent, or mixtures thereof, the ratio by weight of the crosslinking accelerator and co-crosslinking agent to the ionomeric polymer and BASE 4 preferably ranges between about 0.1:100 and about 20:100, and more preferably between about 0.1:100 and about 10:100.

The method can comprise: preparing a dry-mixture or melt-mixture of BASE 4 and an ionomeric polymer comprising a copolymeric or terpolymeric polymer with low or high acid (i.e., greater than 16 weight percent acid) content, which are neutralized to various extents by different metal cations, and adding a crosslinking accelerator, and a co-crosslinking agent to the mixture.

II-3. Silicone/Polyurethane

Example 1

A golf ball composition comprises a polyurethane having a Shore A hardness (ASTM D-2240) of about 40 or higher, and BASE 1, wherein the ratio by weight of the polyurethane to BASE 1 ranges between about 5:95 and about 95:5. More preferably, the ratio by weight of the polyurethane to the BASE 1 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of the crosslinking agent to the polyurethane and BASE 1 preferably ranges between about 0.1:100 and about 10:100, and more preferably between about 0.1:100 and about 5:100. When the composition comprises a crosslinking accelerator, co-crosslinking agent, or mixtures thereof, the ratio by weight of the crosslinking accelerator and co-crosslinking agent to the polyurethane and BASE 1 preferably ranges between about 0.1:100 and about 20:100, and more preferably between about 0.1:100 and about 10:100.

The method can comprise: preparing a dry-mixture or melt-mixture of BASE 1 and a polyurethane having a Shore A hardness (ASTM D-2240) of about 40 or higher, and adding a crosslinking agent such as a platinum complex or organic peroxide, a crosslinking accelerator, and a co-crosslinking agent to the mixture.

The method can also comprise: preparing a concentrate comprising a polyurethane having a Shore A hardness (ASTM D-2240) of about 40 or higher, and a crosslinking agent, a crosslinking accelerator, a co-crosslinking agent, and adding the concentrate to a polyurethane having a Shore A hardness (ASTM D-2240) of about 40 or higher, and BASE 1. The step of preparing a composition can comprise a step of dry-blending the composition, or a step of mixing the composition using a mill, internal mixer or extruder. The step of mixing the composition can comprise melting the composition.

Example 2

A golf ball composition comprising a polyurethane having a Shore A hardness (ASTM D-2240) of about 40 or higher, and BASE 2, wherein the ratio by weight of the polyurethane to the BASE 2 ranges between about 5:95 and about 95:5. More preferably, the ratio by weight of the polyurethane to the BASE 2 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of the crosslinking agent to the polyurethane and BASE 2 preferably ranges between about 0.1:100 and about 10:100, and more preferably between about 0.1:100 and about 5:100. When the composition comprises a crosslinking accelerator, co-crosslinking agent, or mixtures thereof, the ratio by weight of the crosslinking accelerator and co-crosslinking agent to the polyurethane and BASE 2 preferably ranges between about 0.1:100 and about 20:100, and more preferably between about 0.1:100 and about 10:100.

The method can comprise: preparing a thermally curable polyurethane having a Shore A hardness (ASTM D-2240) of about 40 or higher, and adding a crosslinking accelerator, and a co-crosslinking agent to the mixture.

The method can also comprise: preparing a concentrate comprising a polyurethane having a Shore A hardness (ASTM D-2240) of about 40 or higher, and a crosslinking agent, a crosslinking accelerator, a co-crosslinking agent, and adding the concentrate to a polyurethane having a Shore A hardness (ASTM D-2240) of about 40 or higher, and BASE 2. The step of preparing a composition can comprise a step of dry-blending the composition, or a step of mixing the composition using a mill, internal mixer or extruder. The step of mixing the composition can comprise melting the composition.

Example 3

A golf ball composition comprising a polyurethane having a Shore A hardness (ASTM D-2240) of about 40 or higher, and BASE 3, wherein the ratio by weight of the polyurethane to the BASE 3 ranges between about 5:95 and about 95:5. More preferably, the ratio by weight of the polyurethane to the BASE 3 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of the crosslinking agent to the polyurethane and BASE 3 preferably ranges between about 0.1:100 and about 10:100, and more preferably between about 0.1:100 and about 5:100. When the composition comprises a crosslinking accelerator, co-crosslinking agent, or mixtures thereof, the ratio by weight of the crosslinking accelerator and co-crosslinking agent to the polyurethane and BASE 3 preferably ranges between about 0.1:100 and about 20:100, and more preferably between about 0.1:100 and about 10:100.

The method can comprise: preparing a dry-mixture or melt-mixture of BASE 3 and a polyurethane having a Shore A hardness (ASTM D-2240) of about 40 or higher, and adding a crosslinking accelerator, and a co-crosslinking agent to the mixture.

Example 4

A golf ball composition comprising a polyurethane having a Shore A hardness (ASTM D-2240) of about 40 or higher, and BASE 4, wherein the ratio by weight of the polyurethane to the BASE 4 ranges between about 5:95 and about 95:5. More preferably, the ratio by weight of the polyurethane to the BASE 4 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of the crosslinking agent to the polyurethane and BASE 4 preferably ranges between about 0.1:100 and about 10:100, and more preferably between about 0.1:100 and about 5:100. When the composition comprises a crosslinking accelerator, co-crosslinking agent, or mixtures thereof, the ratio by weight of the crosslinking accelerator and co-crosslinking agent to the polyurethane and BASE 4 preferably ranges between about 0.1:100 and about 20:100, and more preferably between about 0.1:100 and about 10:100.

The method can comprise: preparing a dry-mixture or melt-mixture of BASE 4 and a polyurethane having a Shore A hardness (ASTM D-2240) of about 40 or higher, and adding a crosslinking accelerator, and a co-crosslinking agent to the mixture.

II-4. Silicone/Polyamide

Example 1

A golf ball composition comprises aliphatic or aromatic thermoplastic polyamide, which can be any homopolymeric, copolymeric polyamide or mixture of those and BASE 1, wherein the ratio by weight of the polyamide to the BASE 1 ranges between about 5:95 and about 95:5. More preferably, the ratio by weight of the polyamide to the BASE 1 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of the crosslinking agent to the polyamide and BASE 1 preferably ranges between about 0.1:100 and about 10:100, and more preferably between about 0.1:100 and about 5:100. When the composition comprises a crosslinking accelerator, co-crosslinking agent, or mixtures thereof, the ratio by weight of the crosslinking accelerator and co-crosslinking agent to the polyamide and BASE 1 preferably ranges between about 0.1:100 and about 20:100, and more preferably between about 0.1:100 and about 10:100.

The method can comprise: preparing a dry-mixture or melt-mixture of BASE 1 and a thermoplastic polyamide, which can be any thermoplastic crystalline or amorphous high molecular weight solid homopolymer, copolymer or terpolymer having recurring amide units within the polymer chain (in copolymer and terpolymer systems, more than 50 mole percent of the repeat units are amide-containing units.), and adding a crosslinking agent, such as platinum complex, organic peroxide, or mixtures of these, a crosslinking accelerator, and a cocrosslinking agent to the mixture.

The method can also comprise: preparing a concentrate comprising a thermoplastic polyamide, which can be any thermoplastic crystalline or amorphous high molecular weight solid homopolymer, copolymer or terpolymer having recurring amide units within the polymer chain (In copolymer and terpolymer systems, more than 50 mole percent of the repeat units are amide-containing units.), and a crosslinking agent, a crosslinking accelerator, a co-crosslinking agent, and adding the concentrate to a thermoplastic polyamide, which can be any thermoplastic crystalline or amorphous high molecular weight solid homopolymer, copolymer or terpolymer having recurring amide units within the polymer chain (In copolymer and terpolymer systems, more than 50 mole percent of the repeat units are amide-containing units.), and BASE 1. The step of preparing a composition can comprise a step of dry-blending the composition, or a step of mixing the composition using a mill, internal mixer or extruder. The step of mixing the composition can comprise melting the composition.

Example 2

A golf ball composition comprising a thermoplastic polyamide, which can be any thermoplastic crystalline or amorphous high molecular weight solid homopolymer, copolymer or terpolymer having recurring amide units within the polymer chain (in copolymer and terpolymer systems, more than 50 mole percent of the repeat units are amide-containing units), and BASE 2, wherein the ratio by weight of the polyamide to the BASE 2 ranges between about 5:95 and about 95:5. More preferably, the ratio by weight of the polyamide to the BASE 2 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of the crosslinking agent to the polyamide and BASE 2 preferably ranges between about 0.1:100 and about 10:100, and more preferably between about 0.1:100 and about 5:100. When the composition comprises a crosslinking accelerator, co-crosslinking agent, or mixtures thereof, the ratio by weight of the crosslinking accelerator and co-crosslinking agent to the polyamide and BASE 2 preferably ranges between about 0.1:100 and about 20:100, and more preferably between about 0.1:100 and about 10:100.

The method can comprise: preparing a thermoplastic polyamide, which can be any thermoplastic crystalline or amorphous high molecular weight solid homopolymer, copolymer or terpolymer having recurring amide units within the polymer chain (in copolymer and terpolymer systems, more than 50 mole percent of the repeat units are amide-containing units), and adding a crosslinking accelerator, and a co-crosslinking agent to the mixture.

The method can also comprise: preparing a concentrate comprising a thermoplastic polyamide, which can be any thermoplastic crystalline or amorphous high molecular weight solid homopolymer, copolymer or terpolymer having recurring amide units within the polymer chain (in copolymer and terpolymer systems, more than 50 mole percent of the repeat units are amide-containing units), and a crosslinking agent, a crosslinking accelerator, a co-crosslinking agent, and adding the concentrate to a thermoplastic polyamide, which can be any thermoplastic crystalline or amorphous high molecular weight solid homopolymer, copolymer or terpolymer having recurring amide units within the polymer chain (in copolymer and terpolymer systems, more than 50 mole percent of the repeat units are amide-containing units), and BASE 2. The step of preparing a composition can comprise a step of dry-blending the composition, or a step of mixing the composition using a mill, internal mixer or extruder. The step of mixing the composition can comprise melting the composition.

Example 3

A golf ball composition comprising a thermoplastic polyamide, which can be any thermoplastic crystalline or amorphous high molecular weight solid homopolymer, copolymer or terpolymer having recurring amide units within the polymer chain (in copolymer and terpolymer systems, more than 50 mole percent of the repeat units are amide-containing units), and BASE 3, wherein the ratio by weight of the polyamide to the BASE 3 ranges between about 5:95 and about 95:5. More preferably, the ratio by weight of the polyamide to the BASE 3 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of the crosslinking agent to the polyamide and BASE 3 preferably ranges between about 0.1:100 and about 10:100, and more preferably between about 0.1:100 and about 5:100. When the composition comprises a crosslinking accelerator, co-crosslinking agent, or mixtures thereof, the ratio by weight of the crosslinking accelerator and co-crosslinking agent to the polyamide and BASE 3 preferably ranges between about 0.1:100 and about 20:100, and more preferably between about 0.1:100 and about 10:100.

The method can comprise: preparing a dry-mixture or melt-mixture of BASE 3 and a thermoplastic polyamide, which can be any thermoplastic crystalline or amorphous high molecular weight solid homopolymer, copolymer or terpolymer having recurring amide units within the polymer chain (in copolymer and terpolymer systems, more than 50 mole percent of the repeat units are amide-containing units), and adding a crosslinking accelerator, and a co-crosslinking agent to the mixture.

Example 4

A golf ball composition comprising a thermoplastic polyamide, which can be any thermoplastic crystalline or amorphous high molecular weight solid homopolymer, copolymer or terpolymer having recurring amide units within the polymer chain (in copolymer and terpolymer systems, more than 50 mole percent of the repeat units are amide-containing units), and BASE 4, wherein the ratio by weight of the polyamide to the BASE 4 ranges between about 5:95 and about 95:5. More preferably, the ratio by weight of the polyamide to the BASE 4 ranges between about 10:90 and about 90:10, and most preferably between about 20:80 and about 80:20. The golf ball can further comprise UV stabilizers, photostabilizers, photoinitiators, thermal-initiators, co-initiators, antioxidants, colorants, dispersants, mold releasing agents, processing aids, inorganic fillers, organic fillers, or mixtures thereof.

The composition can further comprise a crosslinking agent, co-crosslinking agent, crosslinking accelerator, or mixtures thereof. When the composition comprises a crosslinking agent, the ratio by weight of the crosslinking agent to the polyamide and BASE 4 preferably ranges between about 0.1:100 and about 10:100, and more preferably between about 0.1:100 and about 5:100. When the composition comprises a crosslinking accelerator, co-crosslinking agent, or mixtures thereof, the ratio by weight of the crosslinking accelerator and co-crosslinking agent to the polyamide and BASE 4 preferably ranges between about 0.1:100 and about 20:100, and more preferably between about 0.1:100 and about 10:100.

The method can comprise: preparing a dry-mixture or melt-mixture of BASE 4 and a thermoplastic polyamide, which can be any thermoplastic crystalline or amorphous high molecular weight solid homopolymer, copolymer, or terpolymer having recurring amide units within the polymer chain (in copolymer and terpolymer systems, more than 50 mole percent of the repeat units are amide-containing units), and adding a crosslinking accelerator and a co-crosslinking agent to the mixture.

Methods for Making Golf Balls

In preferred embodiments of the metnod of tne present invention when applied to manufacture of golf balls, the step of incorporating the composition into a golf ball can comprise injection molding the composition to form a spherical layer of the golf ball. Additionally, the ball can comprise a central portion, and the step of incorporating the composition into a golf ball can comprises injection molding the composition to form a first and a second half shell, the half shells configured to mate to form a spherical layer, and compression molding the first and second half shells over the central portion to form a spherical layer.

The step of incorporating the composition into a golf ball can comprise incorporating a composition comprising a crosslinking agent, co-crosslinking agent, crosslinking accelerator, or mixtures thereof into the golf ball. In preferred embodiments of the method, the step of preparing the composition comprises inducing crosslinking in the composition during mixing of the composition, or inducing crosslinking in the composition by injection molding the composition to form a portion of the golf ball, and preferably forming dimples on an outer surface of the portion during injection molding. Additional preferred embodiments of the method comprise injection molding the composition to form a portion of the golf ball and inducing thermal crosslinking of the composition by compression molding the portion, preferably forming dimples on an outer surface of the portion during compression molding; or, inducing crosslinking in the composition by exposing the composition to radiation of an intensity sufficient to induce crosslinking. An additional preferred embodiment of the present invention comprises injection molding the composition to form two half-shells configured to form a spherical layer when joined together, and inducing thermal crosslinking in the composition by compression molding the two half-shells to join the half-shells to form a spherical layer of the golf ball. Wherein the spherical layer may be one of many layers formed from the same or differing materials.

Although the invention has been disclosed in detail with reference only to the preferred compositions and methods, those skilled in the art will appreciate that additional methods for making polymer blends can be made without departing from the scope of the invention.

What is claimed is:

1. A golf ball incorporating a composition comprising:
   a non-silicone material;
   a silicone material; and
   a crosslinking agent,
   wherein the non-silicone material is selected from the group consisting of urethanes, polyepoxides, polyesters, polyamides, polyimides, phenolics, sulfides, acrylics, poly (meth)acrylates, poly (2,6-dimethyl-1,4-phenyleneoxide), polycarbonates, styrene-ethylene-butylene-styrene (SEBS) block copolymers, polyacetals, polyamide-polyether elastomer base resins, copolymeric ionomers, terpolymeric ionomers, epoxides, imides, and mixtures thereof;
   wherein the crosslinking agent is a precious metal selected from the group consisting of rhodium, ruthenium, palladium, osmium, iridium, and platinum;
   and wherein the composition forms a structure selected from the group consisting of an interpenetrating network structure and a thermoplastic vulcanizate structure.

2. The golf ball according to claim 1, wherein the interpenetrating network structure is a semi-interpenetrating network.

3. The golf ball according to claim 1, wherein the interpenetrating network structure is a fully interpenetrating network.

4. The golf ball according to claim 1, wherein the non-silicone material is selected from the group consisting of a monomer, an oligomer, a prepolymer, and a polymer.

5. The golf ball according to claim 1, wherein the composition is formed by blending the silicone material and the non-silicone material, and polymerizing/curing the blend of the silicone material and non-silicone material mixture with the crosslinking agent.

6. The golf ball according to claim 1, wherein the composition is formed under conditions suitable for inducing polymerization/crosslinking selected from the group consisting of an application of thermal energy, an application of uv radiation, and an application of electron beam radiation.

7. The golf ball according to claim 1, further comprising compounds selected from the group consisting of colorants, stabilizers, optical brighteners, antioxidants, processing aids, mold release agents, organic fillers, inorganic fillers, metallic fillers, organic fibers, inorganic fibers, metallic fibers, continuous fibers, non-continuous fibers, and mixtures thereof.

8. The golf ball according to claim 1, wherein the non-silicone material is dispersed in a phase of the silicone material.

9. The golf ball according to claim 1, wherein the silicone material is dispersed in a phase of the non-silicone material.

* * * * *